(12) United States Patent
Kohigashi et al.

(10) Patent No.: US 11,945,526 B2
(45) Date of Patent: Apr. 2, 2024

(54) ELECTRIC VEHICLE

(71) Applicant: HONDA MOTOR CO., LTD., Tokyo (JP)

(72) Inventors: Kenta Kohigashi, Wako (JP); Tsuyoshi Yoshigasaki, Wako (JP); Naoki Matsunaga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 844 days.

(21) Appl. No.: 17/016,557

(22) Filed: Sep. 10, 2020

(65) Prior Publication Data
US 2020/0406996 A1 Dec. 31, 2020

Related U.S. Application Data

(63) Continuation of application No. PCT/JP2018/010506, filed on Mar. 16, 2018.

(51) Int. Cl.
*B62D 55/12* (2006.01)
*B60K 1/02* (2006.01)
(Continued)

(52) U.S. Cl.
CPC .............. *B62D 55/125* (2013.01); *B60K 1/02* (2013.01); *B60K 17/04* (2013.01); *B60L 50/00* (2019.02); *B62D 55/18* (2013.01)

(58) Field of Classification Search
CPC ...... B62D 55/125; B62D 55/18; B62D 55/06; B60K 1/02; B60K 17/04; B60K 17/043; (Continued)

(56) References Cited

U.S. PATENT DOCUMENTS 7,497,796 B2 * 3/2009 Ordo ...................... B62D 11/16
475/5
8,813,879 B2 * 8/2014 Walter .................... H02P 25/22
180/69.6

(Continued)

FOREIGN PATENT DOCUMENTS

JP 7-101364 A 4/1995
JP 9-226638 A 9/1997
(Continued)

OTHER PUBLICATIONS

International Search Report dated May 1, 2018, issued in counterpart International Application No. PCT/JP2018/010506 (2 pages).

*Primary Examiner* — Kevin Hurley
*Assistant Examiner* — Marlon A Arce
(74) *Attorney, Agent, or Firm* — WHDA, LLP

(57) ABSTRACT

An electric vehicle that comprises a vehicle main body, a driving apparatus that includes a motor unit which includes a motor and a reduction gear which is attached to the motor unit, and a travel unit configured to drive by a driving force of the driving apparatus. The travel unit includes a plurality of wheels that at least includes a front wheel arranged on the side of a front end portion of the vehicle main body and a rear wheel arranged on the side of a rear end portion of the vehicle main body, and a crawler belt wound around the front wheel and the rear wheel.

11 Claims, 5 Drawing Sheets

(51) Int. Cl.
*B60K 17/04* (2006.01)
*B60L 50/00* (2019.01)
*B62D 55/125* (2006.01)
*B62D 55/18* (2006.01)

(58) Field of Classification Search
CPC .... B60K 2007/0038; B60K 2007/0061; B60K 7/0007; B60L 50/00; B60L 50/60; B60L 2220/46; B60Y 2200/22; B60Y 2200/41; B60Y 2200/25; Y02T 10/70; F16H 1/06
See application file for complete search history.

(56) References Cited

U.S. PATENT DOCUMENTS

| | | | |
|---|---|---|---|
| 9,604,669 B2 * | 3/2017 | Sonnenburg | B60K 1/02 |
| 2015/0267721 A1 * | 9/2015 | Yasuda | F16H 39/10 60/487 |
| 2016/0272241 A1 | 9/2016 | Sonnenburg et al. | |

FOREIGN PATENT DOCUMENTS

| JP | 3842197 B2 | 11/2006 |
|---|---|---|
| JP | 2013-23165 A | 2/2013 |
| JP | 2015-147552 A | 8/2015 |

\* cited by examiner

ELECTRIC VEHICLE

CROSS-REFERENCE TO RELATED APPLICATION(S)

This application is a continuation of International Patent Application No. PCT/JP2018/010506 filed on Mar. 16, 2018, the entire disclosures of which is incorporated herein by reference.

FIELD OF THE INVENTION

The present invention relates to an electric vehicle that uses a motor as a driving source.

DESCRIPTION OF THE RELATED ART

Japanese Patent No. 3842197 discloses an electric vehicle that uses, as a driving source, a motor which can control each of left and right drive wheels. In the electric vehicle according to Japanese Patent No. 3842197, as a component of each travel unit, a crawler (crawler belt) is arranged on each of the left and right sides of the electric vehicle, and a motor that drives the drive wheel of each travel unit protrudes from the crawler belt and is arranged on the side of the main body of the electronic vehicle.

However, since the motor protrudes from the crawler belt and is arranged on the side of the main body of the electric vehicle in the arrangement of Japanese Patent No. 3842197, a space for arranging the motor is required on the side of the main body of the vehicle, and the degree of freedom in the layout of the electric vehicle can be restricted.

In consideration of the above problem, the present invention provides an electric vehicle in which the degree of freedom in the layout of the electric vehicle can be further increased.

SUMMARY OF THE INVENTION

An electric vehicle according to an aspect of the present invention is an electric vehicle that comprises a vehicle main body, a driving apparatus that includes a motor unit which includes a motor and a reduction gear which is attached to the motor unit, and a travel unit configured to drive by a driving force of the driving apparatus, wherein the travel unit includes a plurality of wheels that at least includes a front wheel arranged on the side of a front end portion of the vehicle main body and a rear wheel arranged on the side of a rear end portion of the vehicle main body, and a crawler belt wound around the front wheel and the rear wheel, and the reduction gear of the driving apparatus includes an input shaft to which a driving force of a rotating shaft of the motor is transmitted, a power transmission unit configured to transmit the driving force of the input shaft, and an output shaft which protrudes to the side of the motor unit and is configured to output the driving force transmitted by the power transmission unit to the travel unit, and the driving apparatus is arranged between the front wheel and the rear wheel and is arranged inside of the crawler belt.

According to the present invention, the degree of freedom in the layout of an electric vehicle can be further increased. In addition, according to the electric vehicle of the present invention, a higher travel stability can be implemented by lowering the arrangement position of a driving apparatus and arranging the driving apparatus in a midsection between the front wheels and the rear wheels.

Further features of the present invention will become apparent from the following description of exemplary embodiments (with reference to the attached drawings).

BRIEF DESCRIPTION OF DRAWINGS

The accompanying drawings, which are incorporated in and constitute a part of the specification, illustrate embodiments of the invention and, together with the description, serve to explain principles of the invention.

DESCRIPTION OF EMBODIMENTS

An embodiment of the present invention will be described below with reference to the accompanying drawings. Components to be described in this embodiment are merely examples and are not limited by the following embodiment.

Figure 1A:
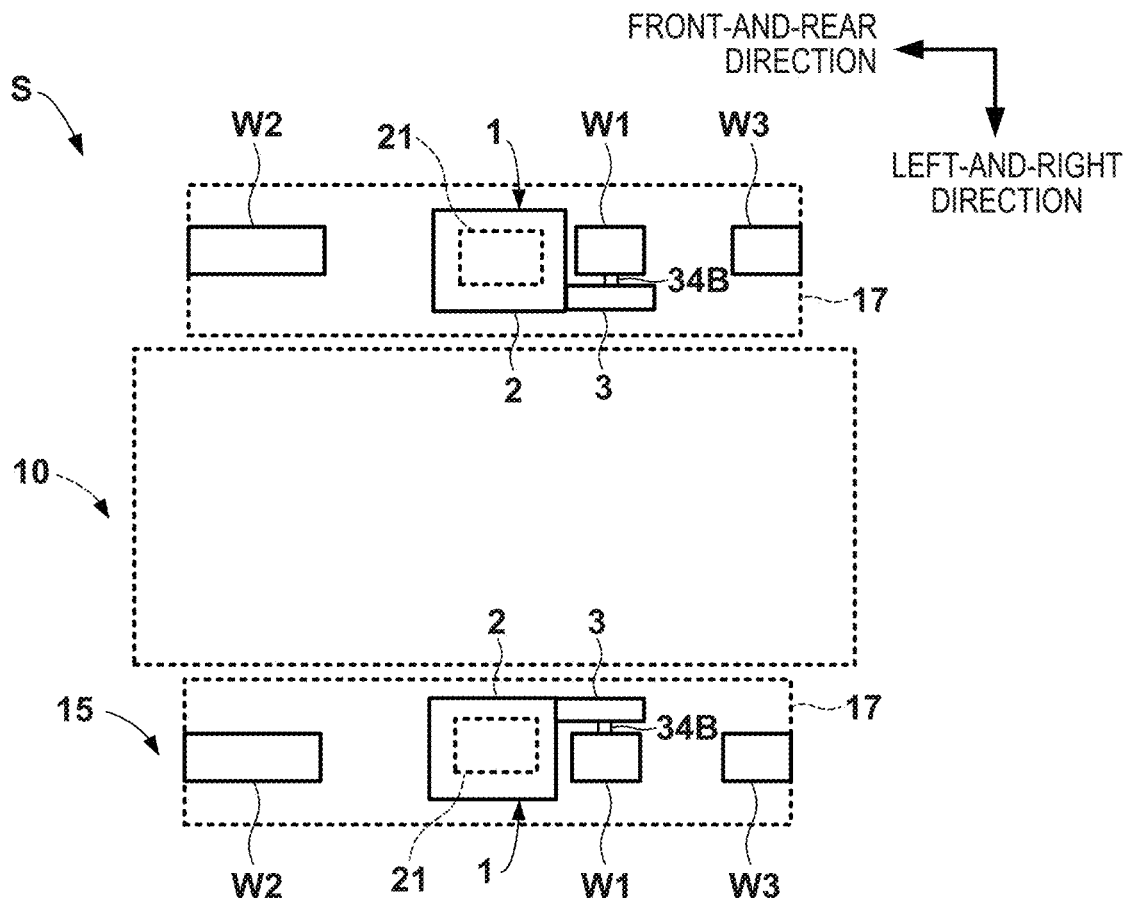
FIG. 1A is a plan view of an electric vehicle S according to an embodiment showing a state in which the electric vehicle S is seen from above.
Figure 1B:
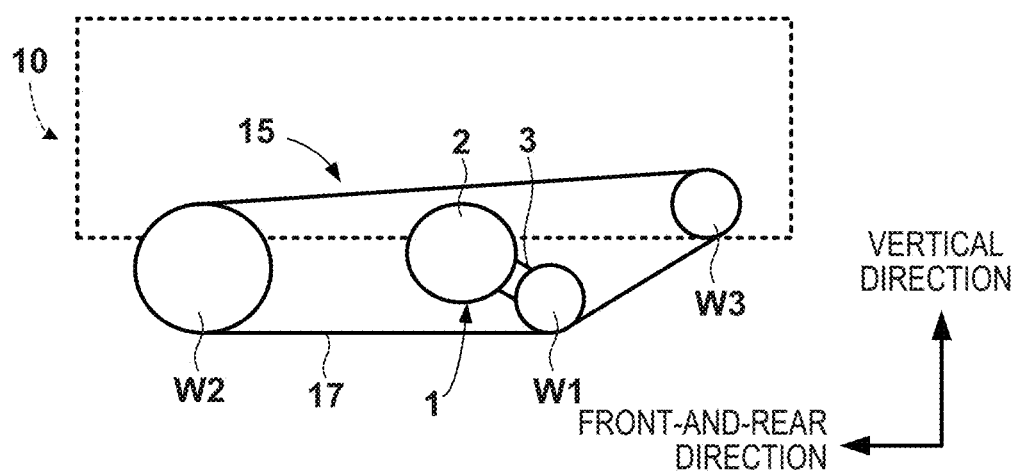
FIG. 1B is a side view of the electric vehicle S according to the embodiment showing a state in which the electric vehicle S is seen from the side.

FIGS. 1A and 1B are views showing the arrangement of an electric vehicle S according to an embodiment. FIG. 1A is a plan view of the electric vehicle S seen from above, and FIG. 1B is a side view of the electric vehicle S seen from the side. The components of each unit will be described hereinafter by setting the direction of travel of the electric vehicle S as the front-and-rear direction, the horizontal direction perpendicular to the direction of travel as the left-and-right direction, and the direction perpendicular to the direction of travel and the horizontal direction as the vertical direction.

The electric vehicle S includes a vehicle main body 10, driving apparatuses 1, and travel units 15. Each driving apparatus 1 includes a motor unit 2 which includes a motor 21 and a reduction gear 3 (transmission) which is attached to the motor unit 2. Each travel unit 15 is driven by the driving force of the corresponding driving apparatus 1.

Each travel unit 15 includes a plurality of wheels (W1 to W3) at least including a front wheel W2 which is attached on the side of a front end portion of the vehicle main body 10 and a rear wheel W3 which is arranged on the side of a rear end portion of the vehicle main body 10, and a crawler 17 (crawler belt) wound around the front wheel W2 and the rear wheel W3.

As the arrangement of the plurality of wheels (W1 to W3), one of the plurality of wheels (W1 to W3) is a drive wheel (for example, W1 in FIGS. 1A and 1B) that transmits a driving force to the crawler belt, and the motor unit 2 and the drive wheel W1 are arranged on the same side with respect to the reduction gear 3 in a planar view of the vehicle (FIG. 1A). Wheels other than the drive wheel W1 among the plurality of wheels (W1 to W3) are driven wheels to be driven by the driving force. In FIGS. 1A and 1B, each front wheel W2 and each rear wheel W3 are driven wheels, and the drive wheel W1 is arranged between the front wheel W2 and the rear wheel W3 in a side view of the vehicle shown in FIG. 1B.

Note that the arrangement of the plurality of wheels (W1 to W3) is not limited to the arrangement shown in FIGS. 1A and 1B, and can be modified into various kinds of combinations. For example, as an arrangement that uses two wheels, the front wheel and the rear wheel may be set as the drive wheel and the driven wheel, respectively, or the rear wheel and the front wheel may be set as the drive wheel and the driven wheel, respectively.

The travel unit 15 is arranged on each of the left and the right directions of the vehicle main body 10, and can be independently driven by the corresponding one of the left and right driving apparatuses 1. When the drive wheel W1 is rotated by the rotational force from the driving apparatus 1, the rotational force of the drive wheel W1 is transmitted to the crawler 17, and the front wheel W2 (driven wheel) and the rear wheel W3 (driven wheel) are rotated by the rotation of the crawler 17. The electric vehicle S can move forward, backward, and rotationally by controlling the rotational directions of the left and right travel units 15.

Each driving apparatus 1 includes the motor unit 2 including a motor and a reduction gear 3 as a power transmission mechanism that transmits the driving force of the motor. The reduction gear 3 is attached to the motor unit 2. In a planar view of the vehicle, an output shaft 34B of the reduction gear 3 protrudes from the side of the reduction gear 3 to the side of the motor unit 2 and outputs the driving force to the travel unit 15. The output shaft 34B is connected to the drive wheel W1.

As shown in FIGS. 1A and 1B, the driving apparatus 1 is arranged between the front wheel W2 and the rear wheel W3 and is arranged inside of the crawler 17 (crawler belt) in the electric vehicle S. In a side view of the vehicle (FIG. 1B), the crawler 17 forms a closed space, and the driving apparatus 1 is arranged in the space formed by the crawler 17. Also, in a planar view of the vehicle (FIG. 1A), each driving apparatus 1 is arranged within the width of the corresponding crawler 17.

By arranging the driving apparatus 1 so as not to protrude from the crawler 17, the space for arranging the driving apparatus 1 on the side of the vehicle main body 10 becomes unnecessary. As a result, the degree of freedom in the layout of the electric vehicle S can be increased.

A similar effect can also be obtained by arranging the motor unit 2 of the driving apparatus 1 so as not to protrude from the crawler 17 because the ratio occupied by the motor unit 2 is larger than that of the reduction gear 3 in the driving apparatus 1. For example, the crawler 17 may be arranged to form a closed spaced in a side view of the vehicle shown in FIG. 1B, the driving apparatus 1 (the motor unit 2 and the reduction gear 3) may be arranged in the space formed by the crawler 17, and the motor unit 2 of the driving apparatus 1 may be arranged to be within the width of the crawler 17 in a planar view of the vehicle in the FIG. 1A.

The driving apparatus 1 is also arranged in the midsection, between the front wheel W2 and the rear wheel W3, of the space in a side view of the vehicle shown in FIG. 1B. By lowering the arrangement position of the driving apparatus 1 and arranging the driving apparatus in the midsection between the front wheel W2 and the rear wheel W3, a higher travel stability can be implemented.

The electric vehicle S according to this embodiment is applicable to a vehicle that includes the crawlers 17 (crawler belts), for example, snow removal equipment, agricultural equipment, a lawnmower, an electric construction vehicle, and the like.

Figure 2:
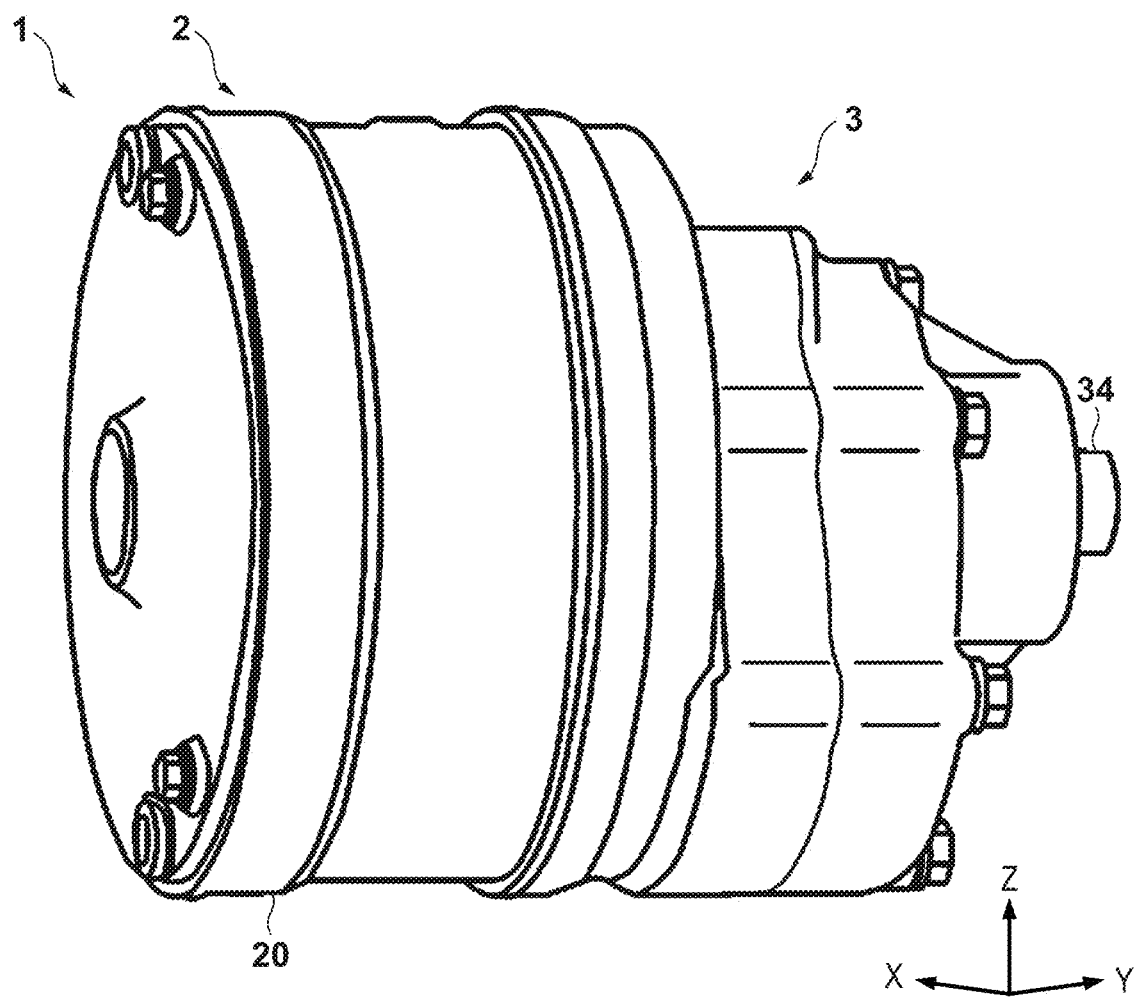
FIG. 2 is a view showing the outer appearance of a driving apparatus according to the embodiment.

FIG. 2 is an outer appearance view of the driving apparatus 1. The driving apparatus 1 has a cylindrical shape as a whole, and an arrow Y indicates the direction of the axis and arrows X and Z indicate radial directions which are perpendicular to each other in this drawing. The driving apparatus 1 is an electric unit that functions as a driving source of the travel mechanism of the electric vehicle S. The driving apparatus 1 includes the motor unit 2 and the reduction gear 3. The reduction gear 3 includes the output shaft 34B, decelerates the rotation output from the motor unit 2, and outputs the decelerated rotation from the output shaft 34B.

Figure 3A:
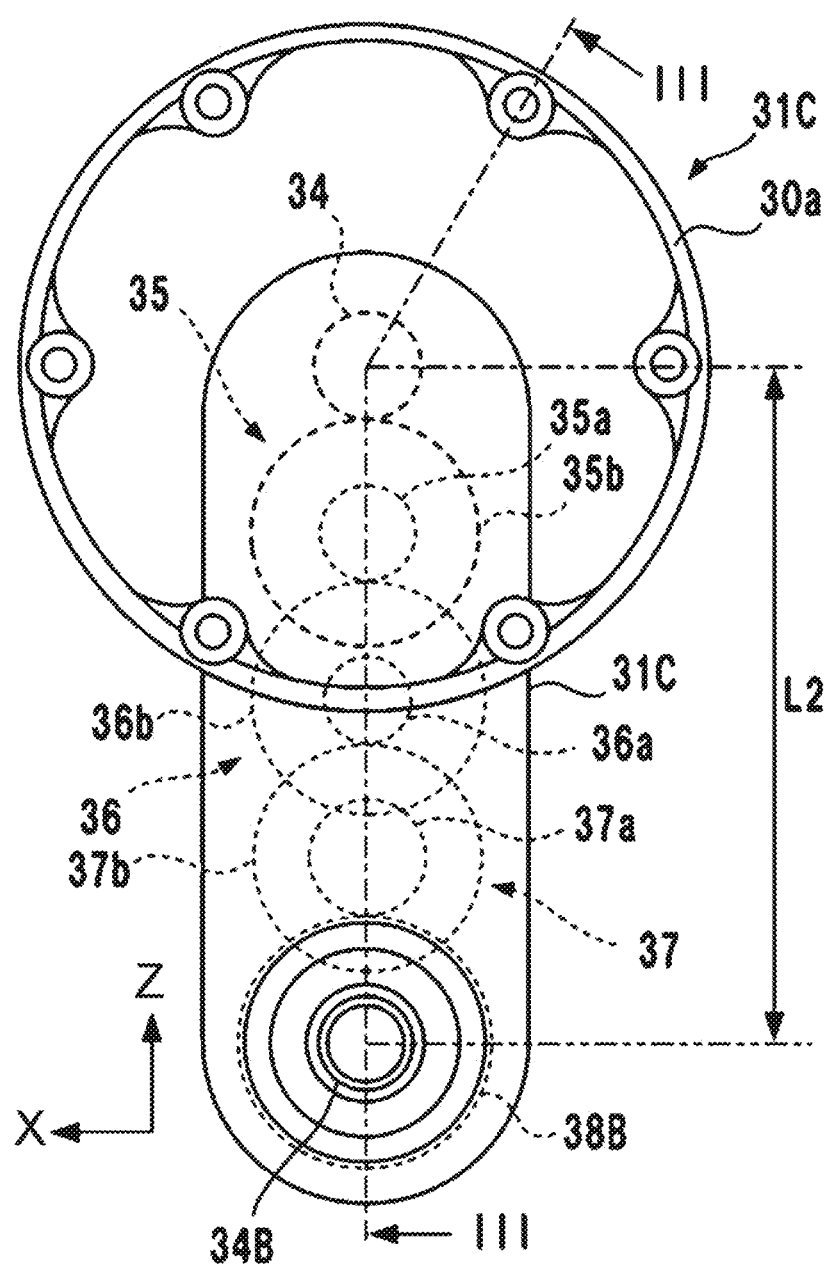
FIG. 3A is a schematic view in which a reduction gear 3 is seen from an end surface on the side of a motor unit 2.
Figure 3B:
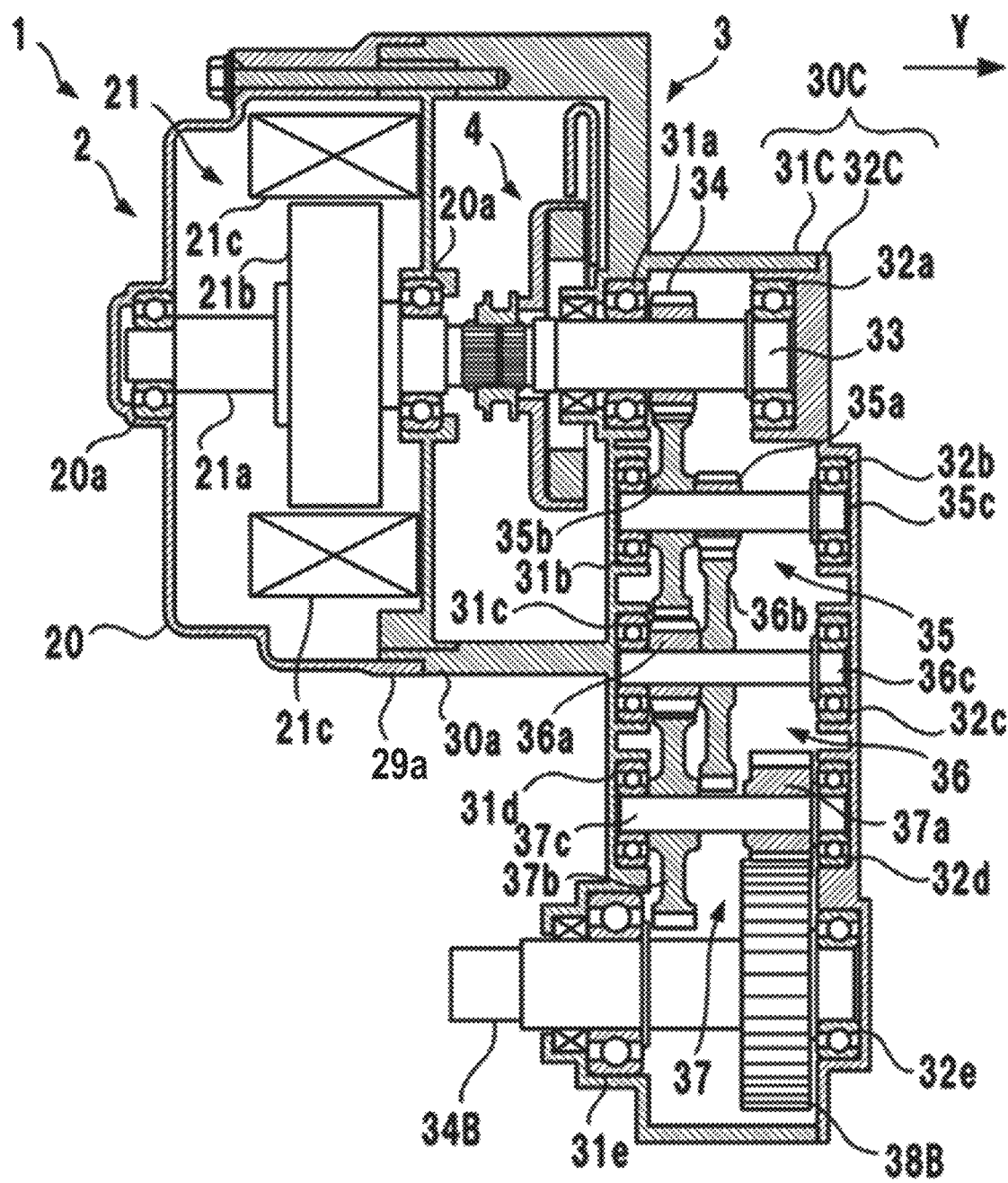
FIG. 3B is a sectional view of a driving apparatus 1 taken along a line III-III of FIG. 3A.

FIG. 3A is a schematic view of the reduction gear 3 seen from the end face on the side of the motor unit 2, and shows the arrangement of an input gear 34, transmission gears 35 to 37, and an output gear 38B incorporated in the reduction gear 3. FIG. 3B is a sectional view of the driving apparatus 1 taken along a line of FIG. 3A. The input gear 34, the transmission gears 35 to 37, and the output gear 38B form a power transmission mechanism for transmitting the driving force of a rotating shaft (input shaft) of the motor. The power transmission mechanism includes a plurality of gears, and the plurality of gears include the input gear 34 that transmits the driving force of the input shaft 33, the transmission gears 35 to 37 that transmit the driving force of the input gear 34, and the output gear 38B that transmits the driving force of the transmission gears 35 to 37 to the output shaft 34B. The centers of the rotating shafts on which the input gear 34, the transmission gears 35 to 37, and the output gear 38B are arranged are positioned on the same straight line.

The reduction gear 3 is separably attached to the motor unit 2 by bolt fastening. The motor unit 2 incorporates the motor 21 inside a barrel-shaped motor case 20. Although the motor 21 is a brushless motor including a rotor (permanent magnet) 21b arranged on a rotating shaft 21a and a stator 21c which has been wound with a coil, a motor of another form can also be employed. The axial direction of the rotating shaft 21a is the Y direction, and the rotating shaft is rotatably supported by a bearing 20a which is supported by the motor case 20.

The reduction gear 3 includes a gear case 30C. The gear case 30C is formed by fixing a case main body 31C and a cover 32C by bolt fastening, and forms a hollow member for containing a mechanism inside. A connecting portion 30a is formed at the end, on the side of the motor unit 2, of the case main body 31C. The connecting portion 30a is fixed to a connecting portion 29a of the motor case 20 by bolt fastening, thereby fixing the motor unit 2 and the reduction gear 3 to each other. Bearings 31a to 31e are supported in the case main body 31C, and bearings 32a to 32e are supported in the cover 32C.

The reduction gear 3 includes an input shaft 33 and the output shaft 34B. The input shaft 33 is coaxial with the rotating shaft 21a and is rotatably supported by the bearings 31a and 32a. A clutch mechanism 4 is arranged in the reduction gear 3 and can disconnect/connect the input shaft 33 and the rotating shaft 21a. In a case in which the input shaft 33 and the rotating shaft 21a are connected by the clutch mechanism 4, the driving force (rotational force) of the rotating shaft 21a of the motor 21 is transmitted to the input shaft 33 of the reduction gear 3. The output shaft 34B is spaced apart from the input shaft 33 and is rotatably supported by the bearings 31e and 32e. The axial direction of the output shaft 34B is the Y direction and is parallel to the input shaft 33. Reference symbol L2 indicates a shaft-to-shaft length between the input shaft 33 and the output shaft 34B. The output gear 38B is fixed to the output shaft 34B.

The input gear 34 is fixed to the input shaft 33. The input gear 34 is a spur gear. The driving force of the input shaft 33 is transmitted from the input gear 34 to the output shaft 34B via the transmission gears 35 to 37 and the output gear 38B. Each of the transmission gears 35 to 37 is formed by a spur gear, and is, in particular, a double gear including a corresponding one of small-diameter gears 35a to 37a and a corresponding one of large-diameter gears 35b to 37b.

The transmission gear 35 is formed by fixing the small-diameter gear 35a and the large-diameter gear 35b, which has a larger diameter than the small-diameter gear 35a, to a shaft 35c. The axial direction of the shaft 35c is the Y direction, and the shaft 35c is rotatably supported by the bearing 31b and the bearing 32b. The large-diameter gear 35b meshes with the input gear 34.

The transmission gear 36 is formed by fixing the small-diameter gear 36a and the large-diameter gear 36b, which has a larger diameter than the small-diameter gear 36a, to a shaft 36c. The axial direction of the shaft 36c is the Y direction, and the shaft 36c is rotatably supported by the bearing 31c and the bearing 32c. The large-diameter gear 36b meshes with the small-diameter gear 35a of the transmission gear 35.

The transmission gear 37 is formed by fixing the small-diameter gear 37a and the large-diameter gear 37b, which has a larger diameter than the small-diameter gear 37a, to a shaft 37c. The axial direction of the shaft 37c is the Y direction, and the shaft 37c is rotatably supported by the bearing 31d and the bearing 32d. The large-diameter gear 37b meshes with the small-diameter gear 36a of the transmission gear 36. The small-diameter gear 37a meshes with the output gear 38B.

The shafts 35c to 37c of the respective transmission gears 35 to 37 are arranged on the same straight line in the Z direction. The input gear 34 and the output gear 38B are also arranged on the same straight line. That is, the central axes of the input gear 34, the transmission gears 35 to 37, and the output gear 38B are on the same straight line in the Z direction. In the arrangement of the driving apparatus 1, the direction of the output shaft 34B is set so as to protrude from the side of the reduction gear 3 to the side of the motor unit 2.

By the above-described arrangement, the driving force of the motor unit 2 can be output, to the rotating shaft 21a and the input shaft 33, from the output shaft 34B, which is arranged in a position spaced apart in the z direction. By arranging the rotating shaft 21a, the input shaft 33, and the output shaft 34B in positions which are spaced apart from each other, the drive wheel and the motor unit can be arranged spaced apart from each other. As a result, the motor unit 2 of the driving apparatus 1 can be arranged in the midsection between the front wheel W2 and the rear wheel W3 in a side view of the vehicle shown in FIG. 1B.

Figure 4A:
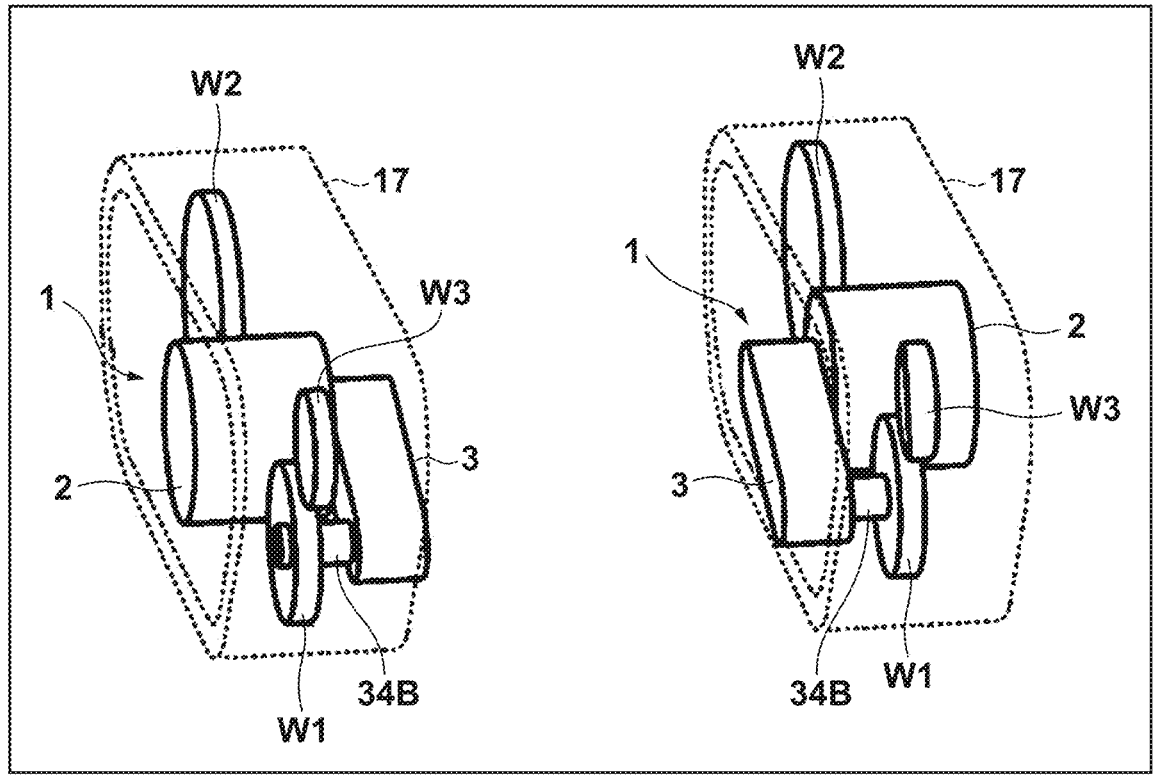
FIG. 4A is a view for exemplifying the layout of the driving apparatus.

As an example of application to the travel units 15 of the electric vehicle S according to this embodiment, it is possible to apply this arrangement as a driving source of each crawler 17 as shown in FIG. 4A. In the example shown in FIG. 4A, the reduction gear 3 is arranged inside of the crawler 17 (crawler belt), and the drive wheel W1 is fixed to the output shaft 34B of the reduction gear 3. Since the output shaft 34B is arranged to protrude to the side of the motor unit 2, the motor unit 2 is also arranged inside of the crawler 17 (crawler belt).

Furthermore, since a comparatively long shaft-to-shaft length (length L2) between the input shaft 33 and the output shaft 34B can be ensured, the motor unit 2 can be arranged in the midsection of the crawler 17 (crawler belt) in the direction of travel while arranging the output shaft 34B at the end of the crawler 17 (crawler belt) in the direction of travel. As a result, the position of the center of gravity of the travel unit 15 can be easily set at the center side of the crawler 17 (crawler belt), and the travel stability can be improved.

Figure 4B:
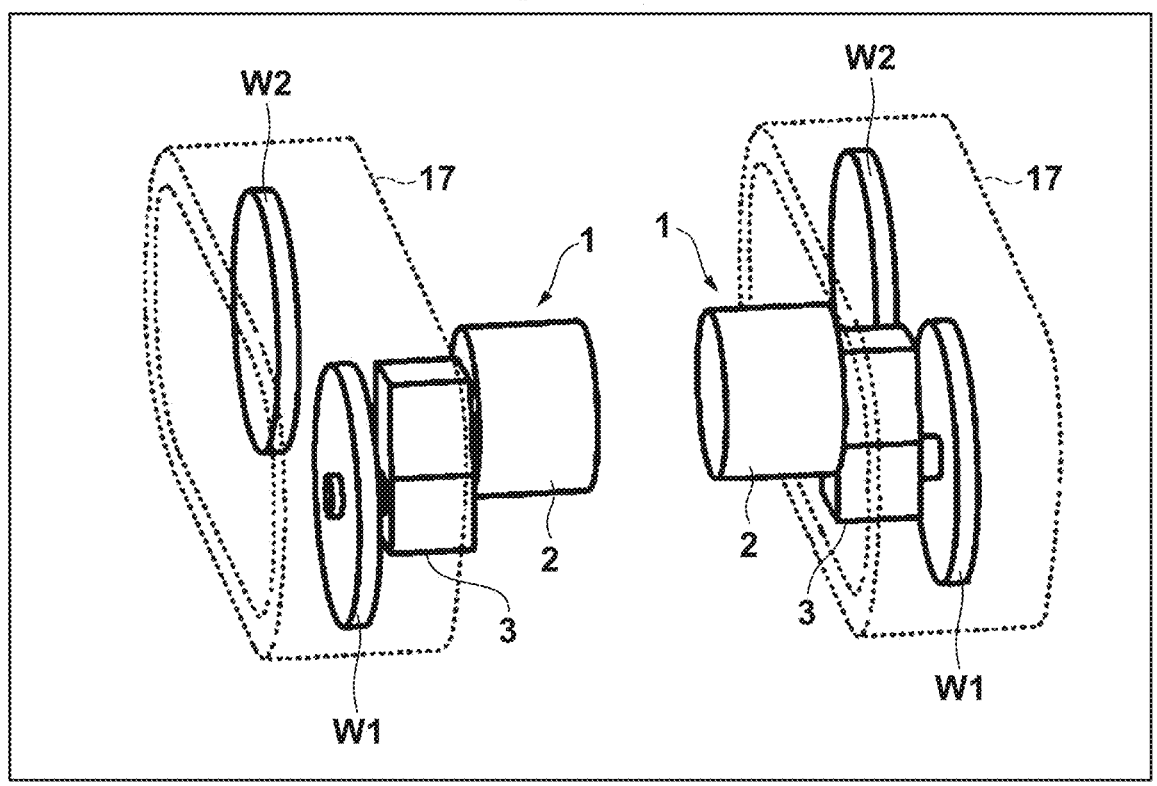
FIG. 4B is a view for exemplifying the layout of a driving apparatus of a comparative example.

FIG. 4B is a view exemplifying a comparative example of the driving apparatus 1. In the example of FIG. 4B, the reduction gear 3 is arranged inside of the crawler 17 (crawler belt), and the drive wheel W1 is fixed to the output shaft of the reduction gear 3. In the driving apparatus 1 of the comparative example, the motor unit 2 is arranged outside (on the side of the vehicle main body 10 of the electric vehicle S) of the crawler 17 (crawler belt).

As shown in FIG. 4A, by setting an arrangement in which the output shaft 34B protrudes to the side of the motor unit 2, the driving apparatus 1 can be arranged inside of the crawler 17 (crawler belt). Also, since the driving apparatus 1 can be arranged inside of the crawler 17, a space for arranging the driving apparatus 1 need not be ensured on the side of the vehicle main body 10, thereby improving the degree of freedom in the layout on the side of the vehicle main body 10. In addition, by setting the arrangement position of the driving apparatus 1 inside the crawler 17 while arranging the driving apparatus between the front wheel W2 and the rear wheel W3, the position of the center of gravity of the electric vehicle S can be lowered compared to the comparative example of FIG. 4B, and travel stability can be improved.

SUMMARY OF EMBODIMENT

Arrangement 1. An electric vehicle according to the above-described embodiment is an electric vehicle (for example, S) that comprises a vehicle main body (for example, 10), a driving apparatus (for example, 1) that includes a motor unit (for example, 2) which includes a motor (for example, 21) and a reduction gear (for example, 3) which is attached to the motor unit, and
  a travel unit (for example, 15) configured to drive by a driving force of the driving apparatus, wherein
  the travel unit (15) includes
  a plurality of wheels (for example, W1-W3) that at least includes a front wheel (for example, W2) arranged on the side of a front end portion of the vehicle main body (10) and a rear wheel (for example, W3) arranged on the side of a rear end portion of the vehicle main body (10), and
  a crawler belt (for example, 17) wound around the front wheel (W2) and the rear wheel (W3), and
  the reduction gear (3) of the driving apparatus (1) includes
  an input shaft (for example, 33) to which a driving force of a rotating shaft of the motor (21) is transmitted,
  a power transmission unit configured to (for example, 34-38B) transmit the driving force of the input shaft, and
  an output shaft (for example, 34B) which protrudes to the side of the motor unit and is configured to output the driving force transmitted by the power transmission unit to the travel unit, and
  the driving apparatus (1) is arranged between the front wheel (W2) and the rear wheel (W3) and is arranged inside of the crawler belt (17).

According to the electric vehicle of arrangement 1, the degree of freedom of the layout of the electric vehicle can be increased.

Also, according to the electric vehicle of arrangement 1, by lowering the arrangement position of the driving apparatus and arranging the driving apparatus in the midsection between the front wheel and the rear wheel, it is possible to implement a higher travel stability.

Arrangement 2. In the electric vehicle according to the above-described embodiment, wherein the power transmission unit includes a plurality of gears (for example, 34-38B), and the plurality of gears include an input gear (for example, 34) configured to transmit the driving force of the input shaft, a transmission gear (for example, 35-37) configured to transmit the driving force of the input gear, and an output gear (for example, 38B) configured to transmit the driving force of the transmission gear to the output shaft, and centers of rotating shafts on which the input gear, the transmission gear, and the output gear are to be arranged are positioned on the same straight line.

Arrangement 3. There is provided the electric vehicle according to the above-described embodiment, wherein the plurality of gears (for example, 34-38B) include a plurality of spur gears arranged adjacent to each other, and each of the plurality of spur gears is a spur gear which includes a small-diameter gear (for example, 35a) and a large-diameter gear (for example, 35b) on a rotating shaft.

Arrangement 4. There is provided the electric vehicle according to the above-described embodiment, wherein the small-diameter gears and the large-diameter gears, which are arranged on adjacent rotating shafts, are arranged in a reversed arrangement order (35b, 35a, 36a, 36b).

According to the electric vehicle of arrangements 2 to 4, the driving force of the motor unit can be output, to the rotating shaft and the input shaft, from the output shaft which is arranged in a position spaced apart from the rotating shaft and the input shaft. The drive wheel and the motor unit can be arranged spaced apart from each other by arranging the rotating shaft, the input shaft, and the output shaft in positions which are spaced apart from each other. As a result, for example, in a side view of the vehicle shown in FIG. 1B, the motor unit of the driving apparatus can be arranged in the midsection between the front wheel and the rear wheel.

Arrangement 5. There is provided the electric vehicle according to the above-described embodiment, wherein in a side view of a vehicle (for example, FIG. 1B), the crawler belt (17) forms a closed space, and the driving apparatus (1) is arranged inside of the space formed by the crawler belt (17), and in a planar view of the vehicle (for example, FIG. 1A), the driving apparatus (1) is arranged to be within a width of the crawler belt (17).

Arrangement 6. There is provided the electric vehicle according to the above-described embodiment, wherein in a side view of a vehicle (FIG. 1B), the crawler belt (17) forms a closed space, and the driving apparatus (1) is arranged inside of the space formed by the crawler belt (17), and in a planar view of the vehicle (FIG. 1A), the motor unit (2) of the driving apparatus (1) is arranged to be within a width of the crawler belt (17).

Arrangement 7. There is provided the electric vehicle according to the above-described embodiment, wherein in a side view of the vehicle (FIG. 1B), the driving apparatus (1) is arranged in a midsection between the front wheel (W2) and the rear wheel (W3) inside the space.

Arrangement 8. There is provided the electric vehicle according to the above-described embodiment, wherein at least one wheel of the plurality of wheels (for example, W1-W3) is a drive wheel (for example, W1) configured to transmit the driving force to the crawler belt, and in the planar view of the vehicle (FIG. 1A), the motor unit (2) of the driving apparatus (1) and the drive wheel (W1) are arranged on the same side with respect to the reduction gear (3).

Arrangement 9. There is provided the electric vehicle according to the above-described embodiment, wherein a wheel other than the drive wheel (W1) among the plurality of wheels (W1-W3) is a driven wheel (for example, FIG. 1A and FIG. 1B, W2, W3) configured to be driven by the driving force.

Arrangement 10. There is provided the electric vehicle according to the above-described embodiment, wherein the front wheel (W2) and the rear wheel (W3) are the driven wheels (For example, FIG. 1A and FIG. 1B), and in the space in the side view of the vehicle (FIG. 1B), the drive wheel (W1) is arranged between the front wheel (W2) and the rear wheel (W3).

According to the electric vehicle of arrangements 5 to 10, the degree of freedom in the layout of the electric vehicle can be increased. According to the electric vehicle of arrangements 5 to 10, by lowering the arrangement position of the driving apparatus and arranging the driving apparatus in the midsection between the front wheel and the rear wheel, it is possible to implement a higher travel stability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An electric vehicle that comprises a vehicle main body, a driving apparatus that includes a motor unit which includes a motor and a reduction gear which is attached to the motor unit, and a travel unit configured to drive by a driving force of the driving apparatus, wherein the travel unit includes a plurality of wheels that at least includes a front wheel arranged on the side of a front end portion of the vehicle main body and a rear wheel arranged on the side of a rear end portion of the vehicle main body, and a crawler belt wound around the front wheel and the rear wheel, and the reduction gear of the driving apparatus includes an input shaft to which a driving force of a rotating shaft of the motor is transmitted, a power transmission unit configured to transmit the driving force of the input shaft, and an output shaft which protrudes to the side of the motor unit and is configured to output the driving force transmitted by the power transmission unit to the travel unit, and the driving apparatus is arranged between the front wheel and the rear wheel and is arranged inside of the crawler belt, and in a planar view of the vehicle, the motor unit of the driving apparatus is arranged, to be inside of the crawler belt and to be within a width of the crawler belt.

2. The electric vehicle according to claim 1, wherein the power transmission unit includes a plurality of gears, and the plurality of gears include
an input gear configured to transmit the driving force of the input shaft,
a transmission gear configured to transmit the driving force of the input gear, and
an output gear configured to transmit the driving force of the transmission gear to the output shaft, and
centers of rotating shafts on which the input gear, the transmission gear, and the output gear are to be arranged are positioned on the same straight line.

3. The electric vehicle according to claim 2, wherein the plurality of gears include a plurality of spur gears arranged adjacent to each other, and
each of the plurality of spur gears is a spur gear which includes a small-diameter gear and a large-diameter gear on a rotating shaft.

4. The electric vehicle according to claim 3, wherein the small-diameter gear and the large-diameter gear, which are arranged on adjacent rotating shafts, are arranged in a reversed arrangement order.

5. The electric vehicle according to claim 1, wherein in a side view of a vehicle, the crawler belt forms a closed space, and the driving apparatus is arranged inside of the space formed by the crawler belt, and
in the planar view of the vehicle, the driving apparatus is arranged to be within the width of the crawler belt.

6. The electric vehicle according to claim 5, wherein in a side view of the vehicle, the driving apparatus is arranged in a midsection between the front wheel and the rear wheel inside the space.

7. The electric vehicle according to claim 6, wherein at least one wheel of the plurality of wheels is a drive wheel configured to transmit the driving force to the crawler belt, and
in the planar view of the vehicle, the motor unit of the driving apparatus and the drive wheel are arranged on the same side with respect to the reduction gear.

8. The electric vehicle according to claim 7, wherein a wheel other than the drive wheel among the plurality of wheels is a driven wheel configured to be driven by the driving force.

9. The electric vehicle according to claim 8, wherein the front wheel and the rear wheel are the driven wheels, and
in the space in the side view of the vehicle, the drive wheel is arranged between the front wheel and the rear wheel.

10. The electric vehicle according to claim 1, wherein in the planar view of the vehicle, the front wheel and the rear wheel are arranged to be within the width of the crawler belt.

11. The electric vehicle according to claim 1, wherein in the planar view of the vehicle, the drive wheel is arranged to be within a width of the motor unit of the driving apparatus in a vehicle width direction, and the drive wheel is arranged between the front wheel and the rear wheel.

* * * * *